(12) United States Patent
Albanese et al.

(10) Patent No.: US 11,915,050 B2
(45) Date of Patent: Feb. 27, 2024

(54) MANAGING TASK OFFLOADING TO EDGE SERVERS IN A MULTI-ACCESS EDGE COMPUTING, MEC, SYSTEM

(71) Applicant: NEC LABORATORIES EUROPE GMBH, Heidelberg (DE)

(72) Inventors: Antonio Albanese, Heidelberg (DE); Vincenzo Sciancalepore, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/255,372

(22) PCT Filed: Jan. 29, 2021

(86) PCT No.: PCT/EP2021/052080
§ 371 (c)(1),
(2) Date: Jun. 1, 2023

(87) PCT Pub. No.: WO2022/117233
PCT Pub. Date: Jun. 9, 2022

(65) Prior Publication Data
US 2023/0401094 A1    Dec. 14, 2023

(30) Foreign Application Priority Data

Dec. 3, 2020   (EP) .................................... 20000436

(51) Int. Cl.
*G06F 9/44*    (2018.01)
*G06F 9/50*    (2006.01)
*G06F 9/54*    (2006.01)

(52) U.S. Cl.
CPC .............. *G06F 9/5005* (2013.01); *G06F 9/54* (2013.01); *G06F 2209/509* (2013.01); *G06F 2209/541* (2013.01)

(58) Field of Classification Search
CPC .... G06F 9/5005; G06F 9/54; G06F 2209/509; G06F 2209/541
See application file for complete search history.

(56) References Cited

FOREIGN PATENT DOCUMENTS

WO   WO 2020/023115 A1   1/2020

OTHER PUBLICATIONS

Sen et al., Machine Learning based Timeliness-Guaranteed and Enerfy-Efficient Task Assignment in Edge Computing Systems, IEEE, 2019, 10 pages. (Year: 2019).*

(Continued)

*Primary Examiner* — Diem K Cao
(74) *Attorney, Agent, or Firm* — Leydig, Voit & Mayer, Ltd.

(57) ABSTRACT

A method of managing task offloading to edge servers in a multi-access edge computing (MEC) system includes receiving, by a task broker implemented at a host management level of the MEC system, a task offloading request from a UE application, analyzing, by the task broker, resource requirements of a task of the task offloading request and running a forecasting mechanism that determines whether the task offloading request will eventually be dropped or not by a system management level of the MEC system. The task broker, based on the determination of the forecasting mechanism, either rejects or provisionally admits the task offloading request.

15 Claims, 3 Drawing Sheets

(56) References Cited

OTHER PUBLICATIONS

Al-Habob et al., Mobile Edge Computing and Artificial Intelligence: A Mutually-Beneficial Relationship, IEEE, Nov. 2019, 8 pages. (Year: 2019).*

Miao, Yiming et al.; "Intelligent task prediction and computation offloading based on mobile-edge cloud computing"; *Future Generation Computer Systems*; Sep. 24, 2019; pp. 925-931; vol. 102; XP055832811; Elsevier; Amsterdam, the Netherlands.

Pham, Xuan-Qui et al.; "Utility-Centric Service Provisioning in Multi-Access Edge Computing"; *Applied Sciences*; Sep. 9, 2019; pp. 3776-3796; vol. 9, No. 18; XP055833033; ISSN: 2076-3417; MDPI; Basel, Switzerland.

* cited by examiner

MANAGING TASK OFFLOADING TO EDGE SERVERS IN A MULTI-ACCESS EDGE COMPUTING, MEC, SYSTEM

CROSS REFERENCE TO RELATED APPLICATIONS

This application is a U.S. National Phase application under 35 U.S.C. § 371 of International Application No. PCT/EP2021/052080, filed on Jan. 29, 2021, and claims benefit to European Patent Application No. EP 20000436.4, filed on Dec. 3, 2020. The International Application was published in English on Jun. 9, 2022 as WO 2022/117233 A1 under PCT Article 21(2).

FIELD OF THE INVENTION

The present invention relates to a method of managing task offloading to edge servers in a multi-access edge computing, MEC, system, as well as to a MEC system for managing task offloading to edge servers.

BACKGROUND

In the last decade, several industries and academic institutions have put their effort in standardizing, developing and deploying cloud computing resources at the edge of the network. In fact, the fifth generation of cellular network technology (5G) has driven the widespread of delay-sensitive and resource-intensive mobile applications, which need closer-to-the-edge servers to overcome the issue of an unpredictable communication delay towards the remote cloud.

The current edge-offloading paradigms require the mobile terminal (UE) and the edge server (ES) to exchange considerable amounts of data over the air, i.e., the input data for the edge application or its related output as result of the computational task (to be sent back to the UE), after performing some admission control procedure at the system management level. In particular, the UE application negotiates its requirements with the network (or cloud) operator, which in turn assigns it to an ES that can satisfy such conditions. Next, the UE receives the session information set (e.g., security keys, IP address or generic identity) so as to proceed with a three-phase offloading procedure, namely data upload, edge processing and output download.

Unfortunately, the initial admission phase takes a non-negligible amount of time as it requires the system-level orchestrator to solve the task-scheduling problem over the entire edge cloud (EC), i.e. the set of ESs, which is known to be a NP-Hard problem. In the following, some relevant prior art works are discussed that tackle this problem.

The problem of task allocation and execution at the edge has been investigated in the literature, especially in the context of ETSI Multi-Access Edge Computing (MEC). In G. Zhao, H. Xu, Y. Zhao, C. Qiao and L. Huang, "Offloading Dependent Tasks in Mobile Edge Computing with Service Caching", IEEE INFOCOM 2020—IEEE Conference on Computer Communications, Toronto, ON, Canada, 2020, pp. 1997-2006, the authors introduce a model for offloading tasks with service caching, i.e. they assume that UEs can deploy the corresponding edge services onto the edge cloud (which shall be utilized herein to denote the set of all ESs) before offloading their tasks, which are supposed to have some dependency among each other. Moreover, they consider the option of relaying the task offloading request to a further ES if the closest one cannot meet the requested computational capacity requirements.

In H. A. Alameddine, S. Sharafeddine, S. Sebbah, S. Ayoubi and C. Assi, "Dynamic Task Offloading and Scheduling for Low-Latency IoT Services in Multi-Access Edge Computing", in IEEE Journal on Selected Areas in Communications, vol. 37, no. 3, pp. 668-682, March 2019, the authors make similar assumptions by studying a network of ESs and allowing task offloading request relay, but they differentiate by accounting for delay requirements while disregarding any possible dependencies among tasks.

Within the scope of task offloading, repetitive tasks stand out driven by the ubiquity of wireless sensors. Specifically, sensors may generate computationally intensive tasks in a periodic fashion, i.e. according to their duty cycle. Moreover, the number of IoT devices is expected to reach 43 billion by 2023, almost triplicating from 2018, thus highlighting the need of taking such operational conditions into account while developing novel EC architectures. In this regard, S. Jošilo and G. Dán, "Computation Offloading Scheduling for Periodic Tasks in Mobile Edge Computing", in IEEE/ACM Transactions on Networking, vol. 28, no. 2, pp. 667-680, April 2020 develops a game theoretical model and derives a polynomial time decentralized algorithm whereby UEs autonomously decide whether to offload their task or not in the current periodic slot.

Additionally, Pham, V.-N.; Nguyen, V.; Nguyen, T. D. T.; Huh, E.-N., "Efficient Edge-Cloud Publish/Subscribe Broker Overlay Networks to Support Latency-Sensitive Wide-Scale IoT Applications", in Symmetry 2020, 12, 3 describes a solution for data dissemination in wide-scale IoT networks by means of a publish/subscribe (pub/sub) broker overlay. In a pub/sub system, clients subscribed to one topic as consumers receive notifications of new events from clients subscribed to the same topic as producers. For instance, a client may produce and disseminate some sensor data to a bunch of interested counterparts. The authors focus on data dissemination among IoT devices and their consumers, disregarding the task offloading problem. Their work builds up on the capabilities of ZooKeeper to propose a distributed system with pub/sub brokers located in the EC and in the core cloud and coordinate servers in the core cloud. However, their approach cannot solve the above-mentioned task admission problem. Specifically, they envision that a set of coordination servers elects a leader to perform task assignments and broker clustering (based on broker topics similarities or geographical vicinity), leveraging Zookeeper nodes data structures. Whenever a new topic is detected, the corresponding broker sends a request to its coordinator, which in turn decides the most appropriate broker for the issuer to subscribe to the topic.

In M. K. Hussein and M. H. Mousa, "Efficient Task Offloading for IoT-Based Applications in Fog Computing Using Ant Colony Optimization," in IEEE Access, vol. 8, pp. 37191-37201, 2020, doi: 10.1109/ACCESS.2020.2975741, the authors disclose an algorithm to perform load balancing for IoT applications in the EC with the aim of reducing the overall application response time. In particular, they consider the communication cost, computation time and average load on each EC server and develop two evolutionary algorithms, namely ant colony optimization and particle swarm optimization, to find a sub-optimal solution of the problem, which is proved to be NP-hard. The model assumes that each IoT node generates data following a Poisson distribution and employs traffic theory concepts to derive time-averaged performance figures, thereby considering full knowledge of static tasks and disregarding the task admission phase.

WO 2020/023115 A1 discloses a method of task offloading and routing in mobile edge cloud networks, wherein a network element determines whether to offload the task to an edge cloud server of a plurality of edge cloud servers distributed within the mobile edge cloud network based on task-related data contained in the offloading request message and server data associated with each of the plurality of edge cloud servers.

All the above-mentioned works stick to a centralized approach whereby UE offloading request needs to go through the system-level management in order to be assigned to the best edge server according some predefined policy. However, the plethora of low-latency applications that edge computing is expected to serve calls for a quicker and smarter admission scheme that may need to drop the centralized approach in favor of a more efficient distributed and hybrid approach.

SUMMARY

In an embodiment, the present disclosure provides a method of managing task offloading to edge servers in a multi-access edge computing (MEC) system, the method including receiving, by a task broker implemented at a host management level of the MEC system, a task offloading request from a UE application; analyzing, by the task broker, resource requirements of a task of the task offloading request and running a forecasting mechanism that determines whether the task offloading request will eventually be dropped or not by a system management level of the MEC system; and by the task broker, based on the determination of the forecasting mechanism, either rejecting or provisionally admitting the task offloading request.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
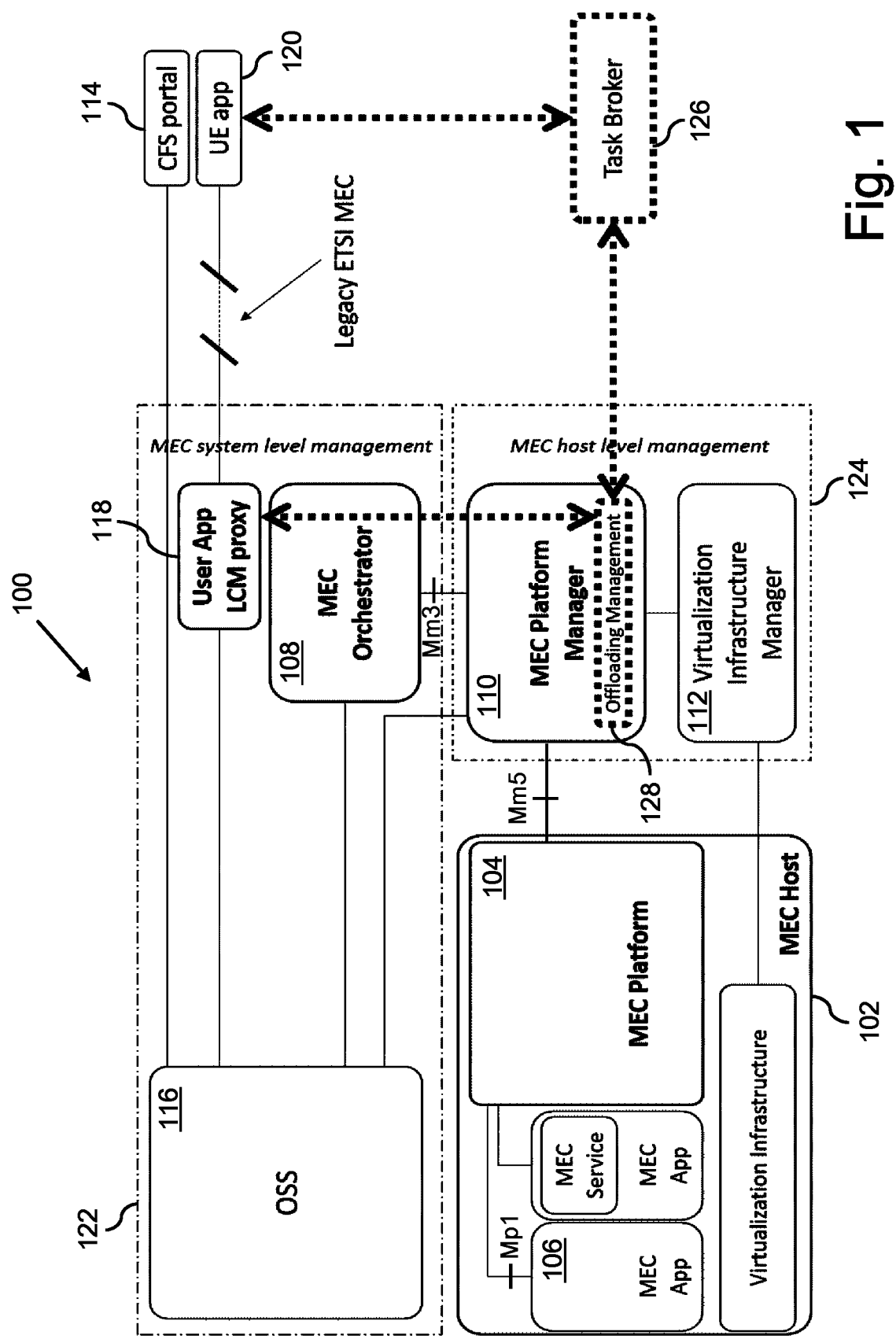
FIG. 1 is a schematic view illustrating a simplified ETSI MEC architecture amended in accordance with an embodiment of the present invention.

In accordance with an embodiment, the present invention improves and further develops a method of managing task offloading to edge servers in a MEC system as well as a MEC system of the initially described type in such a way that a faster admission scheme is provided, in particular for low-latency applications that require to offload delay-sensitive tasks in a repetitive fashion.

In accordance with another embodiment, the present invention provides a method of managing task offloading to edge servers in a multi-access edge computing, MEC, system, the method comprising: receiving, by a task broker implemented at a host management level of the MEC system, a task offloading request from a UE application; analyzing, by the task broker, the resource requirements of the task of the task offloading request and running a forecasting mechanism that determines whether the task offloading request will eventually be dropped or not by the system management level of the MEC system; and, by the task broker, based on the determination of the forecasting mechanism, either rejecting or provisionally admitting the task offloading request.

Furthermore, in accordance with another embodiment, the present invention provides a multi-access edge computing, MEC, system for managing task offloading to edge servers, the system comprising a task broker implemented at a host management level of the MEC system, wherein the task broker is configured to receive a task offloading request from a UE application; analyze the resource requirements of the task of the task offloading request and run a forecasting mechanism that determines whether the task offloading request will eventually be dropped or not by the system management level of the MEC system; and based on the determination of the forecasting mechanism, either reject or provisionally admit the task offloading request.

According to the invention, it has first been recognized that although proven to be effective, task offloading to the edge cloud (EC), i.e. the set of ESs, according to prior art requires system-level admission control. Specifically, after negotiating the UE application requirements, the EC orchestrator selects the most suitable ES for the particular task and provides the UE with all needed information to access this resource. According to the invention it has been further recognized that this procedure introduces some initial delay in processing the request, which may turn into an unaffordable latency in case of UE applications requiring to offload delay-sensitive tasks in a repetitive fashion. To mitigate this problem, embodiments of the present invention provide a solution to skip the initial admission phase at the system management level. Embodiments of the invention provide an all-in-one solution, which combines centralized and distributed approaches in order to schedule repetitive tasks with strict delay requirements, while being fully compliant with the ETSI MEC architecture.

More specifically, embodiments of the invention introduce a task broker (TB) building block at a host management level of the MEC system that is in charge of processing task offloading requests from a UE application and provisionally accommodating them, thereby achieving an overall delay minimization. In fact, embodiments of the invention effectively lower the task admission delay by achieving a truly distributed system that is able to spare the overhead of the system-level admission phase required according to prior art.

The task broker may be co-located with an edge server of an edge cloud, such that each edge server of the edge cloud has its own associated task broker. According to embodiments, the TB building block may be configured to perform one or more of the following actions:

1. The TB receives and relays task offloading requests to the system management level of the MEC system, in particular to the User App LCM Proxy and/or to the Edge Orchestrator of the MEC system.
2. The TB provisionally admits or rejects the task offloading requests, in particular by following AI-based approaches. By provisionally admitting requests, the TB skips the system-level management admission phase, thereby reducing the overall offloading delay.

3. A TB may relay a task offloading request to the next TB if the current ES is overloaded, pursuing the overall delay minimization.

Furthermore, embodiments of the present invention relate to a task offloading method based on a direct interaction with the MEC architecture to manage/broker repetitive delay-sensitive services at the network edge leveraging the novel concept of task broker co-located with each edge server in full compliance with the standard ETSI MEC architecture. Specifically, upon receiving a repetitive task offloading request with a known period from a UE application, the task broker may issue proactive requests to the system management level of the MEC system on behalf of the UE application so as to reserve the required resources on the associated edge server by the time the UE application needs them. As such, the invention proposes a way to keep session continuity between subsequent task offloading requests, while still being compliant with the ETSI MEC standard procedures.

Further embodiments of the invention relate to the introduction of an Offloading Management Service (OMS) building block that may be executed by the MEC Platform Manager. The OMS may be configured to collect measurements to enable the task broker to take AI-based offloading decisions. More specifically, the OMS may be configured to label the active applications running on the respective edge server so as to discriminate between provisionally admitted and finally accepted task offloading requests. Base thereupon, the OMS may generate labeled training samples, including features like ES state information (e.g., CPU load, types of running tasks, network usage) together with the outcome of each provisional grant (but not limited to). The thus generated labeled training samples can be used by a learning algorithm of the task broker to forecast if a particular provisionally admitted request will eventually be dropped or not, thus increasing the provisional request throughput.

There are several ways how to design and further develop the teaching of the present invention in an advantageous way. To this end it is to be referred to the dependent patent claims on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing FIG. 1 illustrates a reference MEC system 100 according to the ETSI MEC architecture, as specified in the standardization document ETSI GS MEC 003, "Multi-Access Edge Computing (MEC); Framework and Reference Architecture", V2.1.1. (2019-01), the entire disclosure of which is hereby incorporated by reference herein. Enhancements according to embodiments of the present invention introduce a number of novel building blocks, which are fully compliant with the ETSI MEC architecture and which are illustrated in FIG. 1 with dotted thick lines. Although described herein primarily with a focus on the ETSI MEC architecture, it will be appreciated by those skilled in the art that embodiments of the present invention can likewise be applied in connection with network edge-offloading architectures other than the ETSI MEC architecture.

The MEC system 100 allows third party application providers to install and run their application software in the service operator's premises. More specifically, the application software is installed at the edge of the network with a direct routing path connected to the users that dramatically abates the communication latency. The MEC system administrator, herein called the MEC provider, owns the MEC hosts 102, i.e., the IT facilities where the MEC platforms 104 reside and where MEC applications 106 run, and manages MEC hosts 102, platforms 104 and applications 106 through an MEC management system, which comprises three components: an MEC orchestrator 108, an MEC platform manager 110 and a virtualized infrastructure manager 112. While the MEC orchestrator 108 is part of the MEC system level management 122, which is centralized and placed in the cloud, the MEC platform manager 110 and the virtualized infrastructure manager 112 are part of the (local) MEC host level management 124, as indicated by the chain dotted lines in FIG. 1.

Generally, in the service model of the MEC system 100, over-the-top (OTT) service and third party service providers, often referred to as MEC tenants, interact with an MEC provider through the Customer Facing Service (CFS) portal 114, which connects MEC tenants to the MEC provider's Operation Support System (OSS) 116. MEC tenants deliver their application package(s) containing a virtual machine image (i.e., the application software) and additional files (e.g., application descriptors, specific KPIs of such application, metadata, manifest, etc.) to the MEC provider. Then, the application on-boarding, instantiation and lifecycle management (LCM) 118 is executed by the MEC provider through its OSS 116 which is connected to the MEC Orchestrator 108 and to the MEC platform manager 110. Thus, the role of the MEC tenant is limited to controlling the application's logic (e.g., through remote access to the application's backports), whereas the MEC provider is responsible for management decisions as follows (not exhaustive list): the place where the application should run (i.e., set of available MEC hosts 102 where the application is installed and executed); application lifecycle management (LCM) operations like bootstrapping, termination, scaling, in/out and up/down, migration in case the host is running out of resources; the application-assigned networking, computing and storage resources; the policies for application migration to other MEC hosts 102; and domain name system (DNS) and traffic rules configuration in order to provide the appropriate connectivity, in fulfilment of the agreed SLAs and of the MEC service provider's policies and capabilities.

As indicated above, according to the legacy MEC implementation, any application (such as UE application 120 shown in FIG. 1) requiring the support of the edge cloud needs to issue a request to the User App Life Cycle Management (LCM) Proxy 118, which allows UE applications 120 to demand on-boarding, instantiation and termination of user applications. Such requests are forwarded to the OSS 116 or to the MEC Orchestrator 108 for further processing. Specifically, the MEC Orchestrator 108, which has a view over every edge server (ES) load, performs the task scheduling procedure and assigns the corresponding tasks to the best suited ES (or set of ESs) of the edge cloud (EC).

However, this message flow does not account for low-latency repetitive requests. Indeed, a situation may occur in which a first UE application 120 request and task offloading assignment expires before the next request comes, thus forcing the UE application 120 to issue a new request and incur in additional delay due to i) reaching the system level management 122, which is centralized and placed in the cloud, and ii) being scheduled on the correct ES.

Embodiments of the present invention address the above disadvantage by providing a novel entity, referred to herein as task broker, TB, 126, which is part of the MEC host level management 124. In connection with the operation of the TB 126, it may be provided that every time the UE application 120 is granted access to an ES, it also receives a token to interact with the specific ES TB 126 for future requests. It should be noted that in order to be first authenticated and admitted into the network, it is mandatory for the UE application 120 to go (at least once) through the admission phase at the system-level management 122.

According to an advantageous embodiment, the TB 126 may be co-located with the ES, thus offering much lower communication delay than any system-level orchestrator, such as MEC orchestrator 108. Whenever the UE application 120 needs to offload the same task to the edge cloud and its previous resource assignment is expired, it may request access to the TB 126 of the last ES it was assigned to.

It is commonly accepted that the MEC system-level management 122 takes task-scheduling decisions at regular time intervals, i.e., system-level time slot ($T_{sl}$). In particular, the system needs to collect a number of requests in order to assess their overall requirements and perform the final assignment. Therefore, according to embodiments of the invention, the TB 126 may be configured to log the latest decisions regarding its ES and to take advantage of these decisions, as will be described in more detail hereinafter.

Based on a record of the latest decisions of the MEC Orchestrator 108 regarding the ES the TB 126 is co-located with, the TB 126 can safely reject all requests with higher requirements than the last dropped provisional request within the current $T_{sl}$. As far as requests with lower requirements are concerned, the TB 126 may be configured to implement a learning algorithm to forecast if that request will eventually be dropped or not, thus increasing a provisional request throughput. The learning algorithm may be any AI learning algorithm such as, e.g. a classification neural network or the like.

In order to keep track of an ES load, the respective TB 126 may interact with the MEC Platform Manager 110. According to embodiments of the invention, the MEC Platform Manager 110 may be configured to run an Offloading Management Service (OMS) 128. The OMS 128 may be in charge of labeling the active ES applications so as to discriminate between granted and provisionally granted offloading requests and kill as few provisionally running tasks as possible in case of resource saturation. In this way, the TB 126 may collect labeled training samples generated by the OMS 128, including, but not limited to, features like ES state information (e.g., CPU load, types of running tasks, network usage, etc.) together with the outcome of each provisional grant.

According to embodiments of the invention, whenever the TB 126 receives a request, it may provisionally grant the request according to the output of its forecasting mechanism, while notifying the MEC Orchestrator 108 of the newly scheduled task. It should be noted that this process is asynchronous, meaning that the MEC Orchestrator 108 could have concurrently scheduled another task on that specific ES and possibly saturate it. In that case, the provisionally granted requests are dropped and the UE application 120 needs to wait for the system-level task scheduling to happen.

In this regard, it is important to note that this approach does not introduce any additional delay with respect to the traditional one as the initial UE request is immediately forwarded to the MEC system-level management 122 and the dominant delay portion of the whole process comes from the top-level task scheduling. Furthermore, it is worth pointing out that the approach according to embodiments of the invention achieves a net gain in comparison to the standard approach, as it does not introduce any additional delay and provides low-latency services while sparing the top-level orchestration delay at a low implementation cost.

Figure 2:
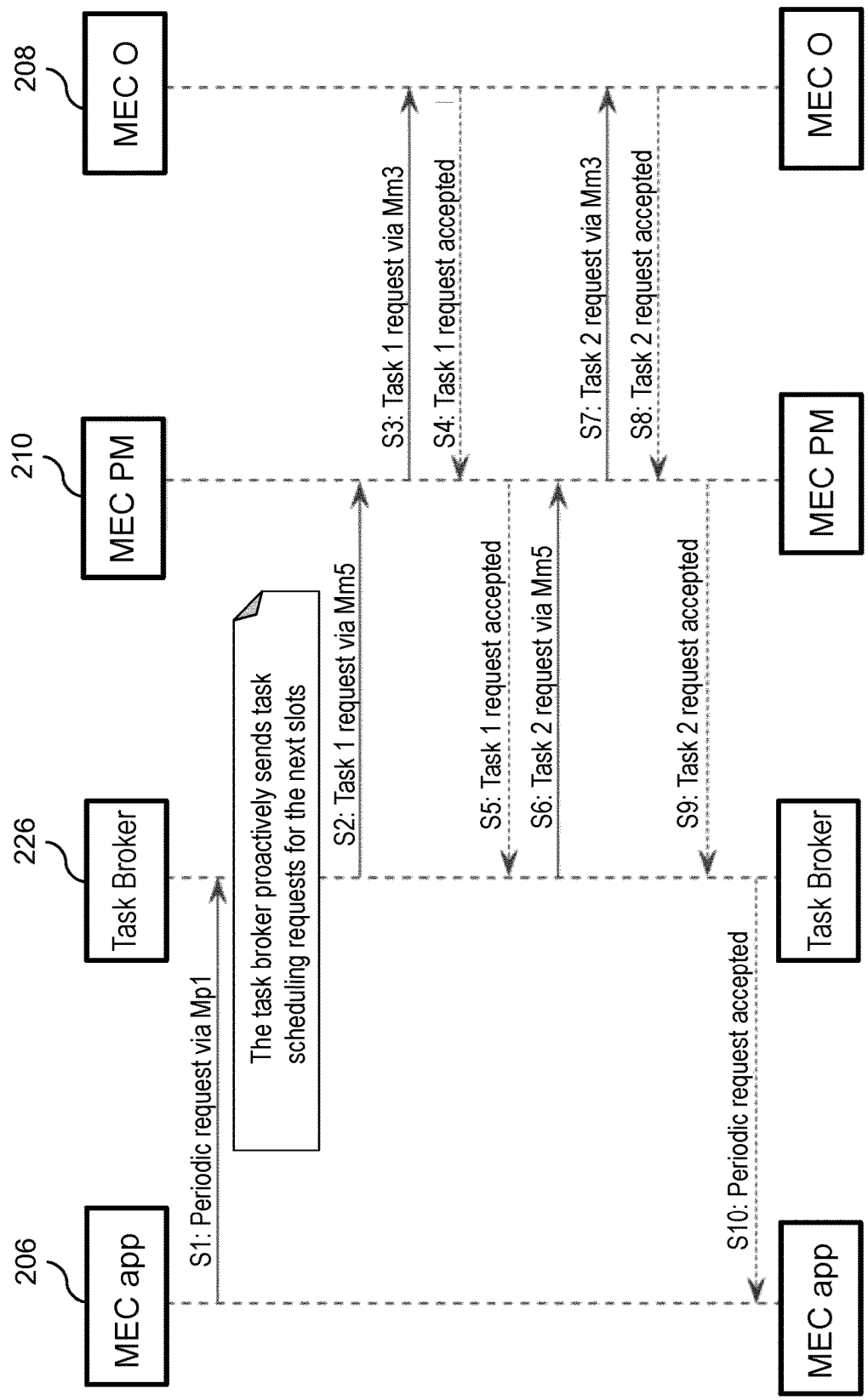
FIG. 2 is a message chart showing processing of periodic task requests in accordance with an embodiment of the present invention.

In accordance with embodiments of the invention, the solution can be extended to deal with periodic requests, i.e. repetitive requests with a known period, while preserving full compliance with the ETSI MEC functional architecture. To avoid modifications of the functions of the system-level management 122, the TB 126 may be configured to issue proactive requests to the User app LCM proxy 118 and/or the MEC Orchestrator 108 on behalf of the UE application 120, so that the required resources can be reserved on the specific ES by the time the UE application 120 needs them. In this context it may be provided that the TB 126 communicates back to the UE application 120 all access information even if the assigned ES is different to the original one, i.e. the one the TB 126 is collocated with. FIG. 2 illustrates the message chart for this embodiment.

As shown at step S1 in FIG. 2, a MEC application 206, such as the MEC application 106 shown in FIG. 1, transmits a request related to a periodic task via Mp1 to a task broker 226, such as TB 126 shown in FIG. 1. Knowing the period of the repetitive task of the requests, the task broker 226 may be configured to proactively send task scheduling requests for each of the respective next slots. FIG. 2 depicts the message flow associated with this process for two tasks of the request, namely Task 1 and Task 2. Specifically, as shown at step S2, the TB 226 transmits a request for Task1 of the request via Mm5 to the MEC platform manager 210, such as the MEC platform manager 110 shown in FIG. 1. As shown at S3, the MEC platform manager 210 forwards the request via Mm3 to the MEC orchestrator 208, such as MEC orchestrator 108 shown in FIG. 1. Assuming that enough resources are available on the respective ES, the MEC orchestrator 208 transmits a message to the MEC platform manager 210 indicating acceptance of the Task 1 request, as shown at S4. Similarly, as shown at S5, the MEC platform manager 210 transmits and accept message to the TB 226. The same process, including steps S6-S9, is repeated for Task 2 of the request. Upon receipt of the acceptance message for Task 2, the TB 226 transmits a message to the MEC application 206 indicating acceptance of its periodic request, as shown at S10.

According to an alternative embodiment, it may be provided that, whenever a TB 126, associated with a certain ES and serving a particular UE application 120, forecasts that a request of the UE application 120 will be dropped, it also forwards this request to its closest TB co-located with another ES in the attempt of scheduling the respective task on that ES. If the request is accepted, the serving TB 126 informs the UE application 120 of the new ES onto which it is allowed to offload its task.

It should be noted that this is a tentative approach, as it cannot be naturally assumed that TBs propagate their forecasted state to other TBs. However, according to embodiments of the invention it may be provided that distributed information sharing solutions are employed to provide each TB with real-time forecasted state information of the neighboring ones so that the system could spare the network and CPU resources needed to relay the request to a possibly unloaded (or at least not overloaded) neighboring ES. For instance, a blockchain wherein each TB is a node may be used as distributed information sharing solution. In any case, it should be noted that there is no difference in terms of time delay as the request is always first forwarded to the system-level orchestration, which executes the scheduling over the entire Edge Computing network.

As already indicated above, the Task Broker TB 126 may be configured to interact with the MEC Platform Manager 110 by means of the Mm5 interface. According to an embodiment of the invention, it may be provided that when a task offloading request cannot be accepted, the TB 126 may contact the MEC Platform Manager 110 and/or the MEC Orchestrator 108 to find a suitable TB to accommodate the request. This may be performed via Mp3 among different MEC Orchestrators 108. Once the request is accepted, the task offloading will be performed by the selected Traffic Broker, as shown in FIG. 3.

Figure 3:
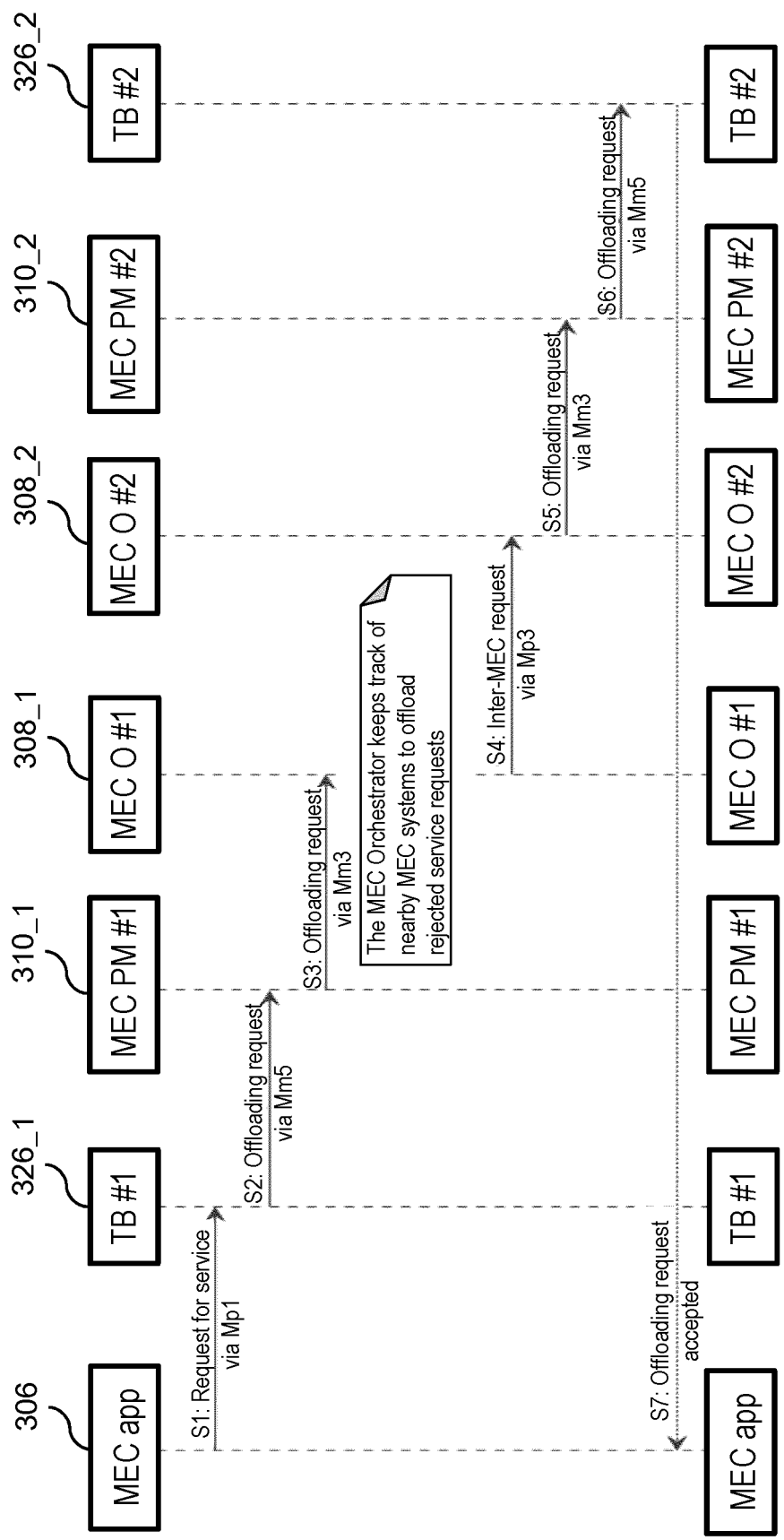
FIG. 3 is a message chart showing communication between different MEC systems in accordance with an embodiment of the present invention.

As shown at step S1 in FIG. 3, a MEC application 306, such as the MEC application 106 shown in FIG. 1, transmits a request for service via Mp1 to a first task broker 326_1, such as TB 126 shown in FIG. 1. Upon receipt of this request for service, at step S2, the first task broker 326_1 transmits an offloading request via Mm5 to a first MEC platform manager 310_1, such as the MEC platform manager 110 shown in FIG. 1, who forwards the request (as shown at step S3) via Mm3 to a first MEC orchestrator 308_1, such as the MEC platform manager 108 shown in FIG. 1.

The MEC Orchestrator 308_1 may be configured to keep track of nearby MEC systems to offload rejected service requests. Based on such records, the MEC Orchestrator 308_1 selects a suitable MEC system and transmits via Mp3 an inter-MEC request regarding the—still unserved—request for service of the MEC application 306 to the selected MEC system's MEC Orchestrator (referred to herein as second MEC Orchestrator 308_2), as shown at step S4.

Upon receipt of this request for service, at step S5, the second MEC orchestrator 308_2 transmits an offloading request via Mm3 to a respective second MEC platform manager 310_2, who forwards the request (as shown at step S6) via Mm5 to a respective second task broker 326_2. In case the second MEC system is able to accommodate the request, i.e. in case of the ES of the second MEC system has enough resources available to process the request, the second task broker 326_2 transmits a message to the MEC application 306, as shown at S7, acknowledging that the offloading of the MEC application's 306 request for service is accepted. In this context, it may be provided that the acknowledgment message contains all relevant information about the new ES onto which the MEC application 306 is allowed to offload its task(s).

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of managing task offloading to edge servers in a multi-access edge computing (MEC) system, the method comprising:
   receiving, by a task broker implemented at a host management level of the MEC system, a task offloading request from a UE application;
   analyzing, by the task broker, resource requirements of a task of the task offloading request and running a forecasting mechanism that determines whether the task offloading request will eventually be dropped or not by a system management level of the MEC system; and
   by the task broker, based on the determination of the forecasting mechanism, either rejecting or provisionally admitting the task offloading request.

2. The method according to claim 1, further comprising:
   relaying, by the task broker, the task offloading request to the system management level of the MEC system,
   wherein an MEC orchestrator, in case the task offloading request had been provisionally admitted by the task broker, decides, based on the overall requirements of a plurality of task offloading requests received within a system-level time slot ($T_{sl}$), and the available resources of the respective edge server, either to drop or to finally accept the provisionally admitted request.

3. The method according to claim 2, further comprising:
   rejecting, by the task broker, all task offloading requests having a resource requirement higher than a resource requirement of the last provisionally accepted request that was dropped by the MEC orchestrator within the current system-level time slot ($T_{sl}$), and
   applying, by the task broker, a learning algorithm to forecast based on a task offloading request having a first resource requirement lower than a second resource requirement of the last provisionally accepted request that was dropped by the MEC orchestrator within the current system-level time slot ($T_{sl}$), will eventually be dropped or not.

4. The method according to claim 3, wherein an MEC Platform Manger runs an Offloading Management Service (OMS) that labels the active applications running on the respective edge server so as to discriminate between provisionally admitted and finally accepted task offloading requests, wherein the task broker interacts with the OMS in order to keep track of a load of a respective edge server and to collect labeled training samples generated by the OMS for training a learning algorithm of the task broker.

5. The method according to claim 1, wherein the task broker is co-located with an edge server of an edge cloud.

6. The method according to claim 1, wherein the task broker, upon receiving the task offloading request from the UE application, provides the UE application a token to be used by the UE application to interact with the task broker for future requests.

7. The method according to claim 1, wherein the UE application, whenever it needs to offload a same task to an edge cloud and its previous resource assignment has expired, requests access to the task broker of a last edge server the UE application was assigned to.

8. The method according to claim 1, further comprising:
receiving, by the task broker, a repetitive task offloading request with a known period from the UE application; and
issuing, by the task broker, proactive requests to the system management level of the MEC system on behalf of the UE application so as to reserve the required resources on an associated edge server by the time the UE application needs them.

9. The method according to claim 1, wherein the task broker keeps record of a configurable number of latest system management level decisions regarding the allocation of resources of its associated edge server to task offloading requests of UE applications.

10. A multi-access edge computing (MEC) system for managing task offloading to edge servers, the system comprising one or more processors and a task broker implemented at a host management level of the MEC system, wherein the task broker is configured to:
receive a task offloading request from a UE application;
analyze resource requirements of a task of the task offloading request and run a forecasting mechanism that determines whether the task offloading request will eventually be dropped or not by a system management level of the MEC system; and
based on the determination of the forecasting mechanism, either reject or provisionally admit the task offloading request.

11. The system according to claim 10, wherein the task broker is co-located with an edge server of an edge cloud.

12. The system according to claim 10, wherein the task broker is further configured to:
receive a repetitive task offloading request with a known period from the UE application, and
issue proactive requests to the system management level of the MEC system on behalf of the UE application so as to reserve required resources on the associated edge server by the time the UE application needs them.

13. The system according to claim 10, wherein the MEC Platform Manger runs an Offloading Management Service (OMS) that labels the active applications running on respective edge server so as to discriminate between provisionally admitted and finally accepted task offloading requests.

14. The system according to claim 13, wherein the forecasting mechanism of the task broker includes a learning algorithm, and wherein the task broker is configured to interact with the OMS in order to keep track of a load of a respective edge server and to collect labeled training samples generated by the OMS for training the learning algorithm of the task broker.

15. A tangible, non-transitory computer-readable medium comprising instructions for a task broker for deployment in an MEC system, the instructions, upon being executed by one or more processors, providing for execution of the following steps by the task broker:
receive a task offloading request from a UE application;
analyze resource requirements of a task of the task offloading request and run a forecasting mechanism that determines whether the task offloading request will eventually be dropped or not by a system management level of the MEC system; and
based on the determination of the forecasting mechanism, either reject or provisionally admit the task offloading request.

* * * * *